(12) United States Patent
Sakamoto et al.

(10) Patent No.: US 12,358,526 B2
(45) Date of Patent: Jul. 15, 2025

(54) VEHICLE

(71) Applicant: TOYOTA JIDOSHA KABUSHIKI KAISHA, Toyota (JP)

(72) Inventors: Shoji Sakamoto, Shizuoka-ken (JP); Kazumi Tsuchiya, Gotemba (JP); Makoto Matsushita, Ichinomiya (JP); Takeshi Takemoto, Nagoya (JP); Shunsuke Sagara, Nisshin (JP); Hideaki Shiraishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/464,638

(22) Filed: Sep. 11, 2023

(65) Prior Publication Data

US 2024/0208535 A1 Jun. 27, 2024

(30) Foreign Application Priority Data

Dec. 22, 2022 (JP) ................................ 2022-206066

(51) Int. Cl.
| | |
|---|---|
| *B60W 60/00* | (2020.01) |
| *B60S 1/48* | (2006.01) |
| *B60S 1/56* | (2006.01) |
| *B60W 40/02* | (2006.01) |

(52) U.S. Cl.
CPC ........... *B60W 60/001* (2020.02); *B60S 1/485* (2013.01); *B60S 1/56* (2013.01); *B60W 40/02* (2013.01); *B60W 2420/403* (2013.01); *B60W 2555/20* (2020.02); *B60W 2556/50* (2020.02)

(58) Field of Classification Search
CPC ...... B60W 10/30; B60W 30/18; B60W 40/02; B60W 2050/0002; B60W 60/001; B60W 2420/40; B60W 2420/403; B60W 2555/20; B60W 2710/30; B60W 2556/50; B60W 2556/45; G06V 20/56; G05D 1/02; G05D 1/0278; G05D 2105/10; B60S 1/02; B60S 1/46; B60S 1/48; B60S 1/485; B60S 1/56; B60S 1/66
See application file for complete search history.

(56) References Cited

U.S. PATENT DOCUMENTS

| | | | |
|---|---|---|---|
| 6,266,842 B1* | 7/2001 | Muller | B60S 1/50 |
| | | | 239/303 |
| 2017/0225658 A1* | 8/2017 | Quintero Perez | B60L 1/003 |
| 2017/0291600 A1* | 10/2017 | Styles | B60W 40/02 |
| 2020/0192356 A1* | 6/2020 | Stenneth | G01C 21/3691 |
| 2022/0324438 A1* | 10/2022 | Liu | B60W 50/14 |
| 2023/0142305 A1* | 5/2023 | Zhao | G06V 10/22 |
| | | | 701/22 |
| 2023/0373504 A1* | 11/2023 | Diamond | G06V 20/56 |

FOREIGN PATENT DOCUMENTS

JP 2008-273358 A 11/2008

\* cited by examiner

*Primary Examiner* — Peter D Nolan
*Assistant Examiner* — Brandon Z Willis
(74) *Attorney, Agent, or Firm* — SoraIP, Inc.

(57) ABSTRACT

The vehicle includes a weather information acquisition unit that acquires weather information from a global precipitation satellite, and an autonomous driving control unit that causes the vehicle to travel at a point equal to or larger than a predetermined precipitation amount acquired from the weather information.

4 Claims, 7 Drawing Sheets

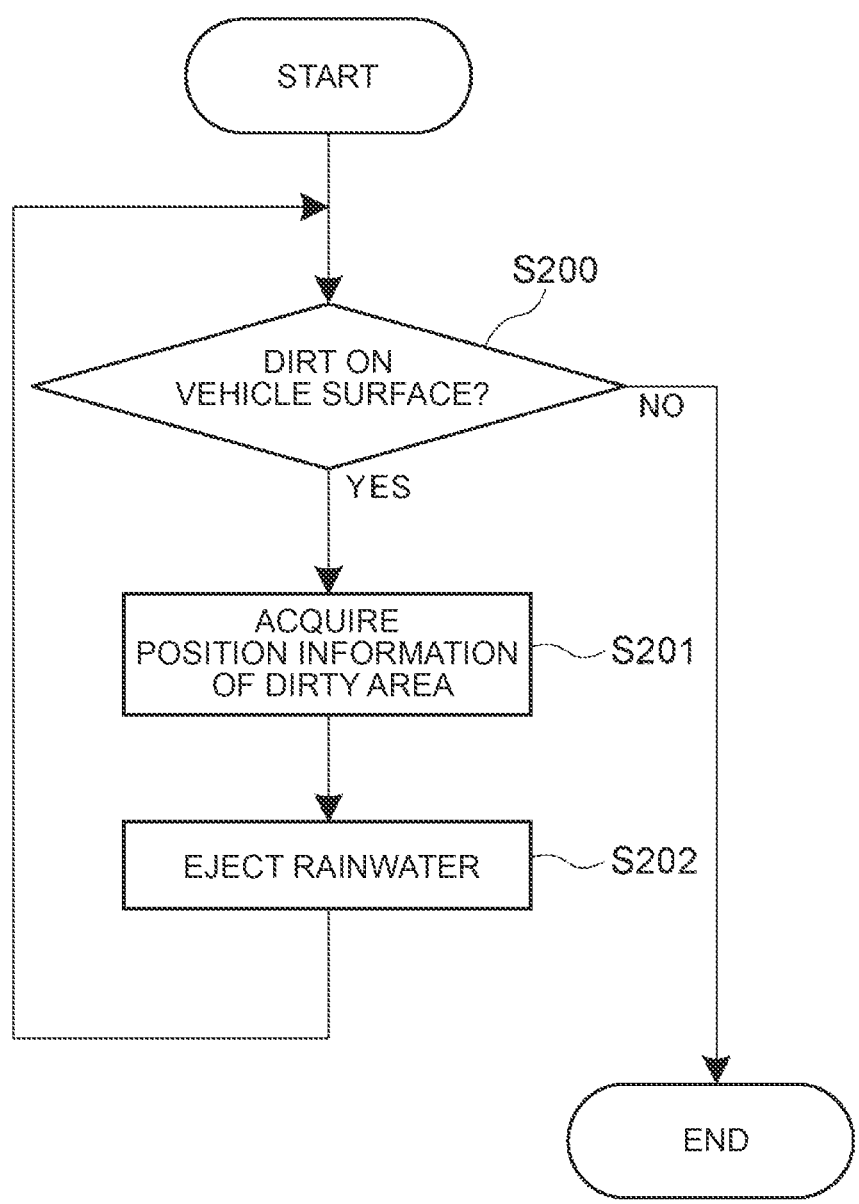

VEHICLE

CROSS-REFERENCE TO RELATED APPLICATION

This application claims priority to Japanese Patent Application No. 2022-206066 filed on Dec. 22, 2022, incorporated herein by reference in its entirety.

BACKGROUND

1. Technical Field

The present disclosure relates to vehicles.

2. Description of Related Art

Japanese Unexamined Patent Application Publication No. 2008-273358 (JP 2008-273358 A) discloses an disclosure related to an air conditioner for a vehicle. This air conditioner stores rainwater in a rainwater storage tank of the vehicle and uses the rainwater to cool components in an engine compartment.

SUMMARY

Rainwater can be used for various purposes such as cooling of components as described above. Whatever purpose the rainwater is used for, it is preferable that the rainwater be stably supplied to a vehicle. However, JP 2008-273358 A does not mention actively supplying rainwater to the rainwater storage tank of the vehicle. That is, the related art described in JP 2008-273358 A has room for improvement in increasing the likelihood that rainwater is supplied to the vehicle.

In view of the above circumstances, it is an object of the present disclosure to provide a vehicle that can increase the likelihood that rainwater is supplied to the vehicle.

A vehicle according to a first aspect of the present disclosure includes: a weather information acquisition unit configured to acquire weather information from an artificial satellite; and an autonomous driving control unit configured to cause the vehicle to travel to a point with predetermined precipitation or more acquired from the weather information.

According to the first aspect of the present disclosure, the weather information acquisition unit acquires the weather information from the artificial satellite. The autonomous driving control unit causes the vehicle to travel to the point with the predetermined precipitation or more acquired from the weather information. That is, according to the present disclosure, it is possible to increase the likelihood that the vehicle is located at a point where it is raining.

A vehicle according to a second aspect of the present disclosure may further include, in the disclosure according to the first aspect: a rainwater storage unit configured to store rainwater; and an ejection unit configured to eject the rainwater stored in the rainwater storage unit onto a surface of the vehicle.

According to the second aspect of the present disclosure, the vehicle includes the rainwater storage unit, and the vehicle travels to the point where it is raining, so that rainwater can be stored in the rainwater storage tank.

In the present disclosure, the vehicle includes the ejection unit, and dirt etc. on the surface of the vehicle can be washed away by ejecting the rainwater stored in the rainwater storage unit from the ejection unit onto the surface of the vehicle.

A vehicle according to a third aspect of the present disclosure may further include, in the disclosure according to the second aspect: a dirt detection unit configured to detect a dirty area on the surface based on an image of the surface; and a wash control unit configured to cause the ejection unit to eject the rainwater to the dirty area.

According to the third aspect of the present disclosure, the dirt detection unit detects a dirty area on the surface of the vehicle based on the image of the surface of the vehicle. The wash control unit then causes the ejection unit to eject the rainwater to the dirty area. Therefore, according to the present disclosure, it is possible to eject the rainwater intensively to the dirty area on the surface of the vehicle.

As described above, the vehicle according to the first aspect of the present disclosure is advantageous in that the likelihood that rainwater is supplied to the vehicle can be increased.

The vehicle according to the second aspect of the present disclosure is advantageous in that it is possible to use rainwater to clean the vehicle.

The vehicle according to the third aspect of the present disclosure can reduce the amount of rainwater required to clean the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a flowchart illustrating a flow of processing performed by the vehicle control device mounted on the vehicle according to the present embodiment at the time of cleaning the vehicle.

DETAILED DESCRIPTION OF EMBODIMENTS

Figure 1:
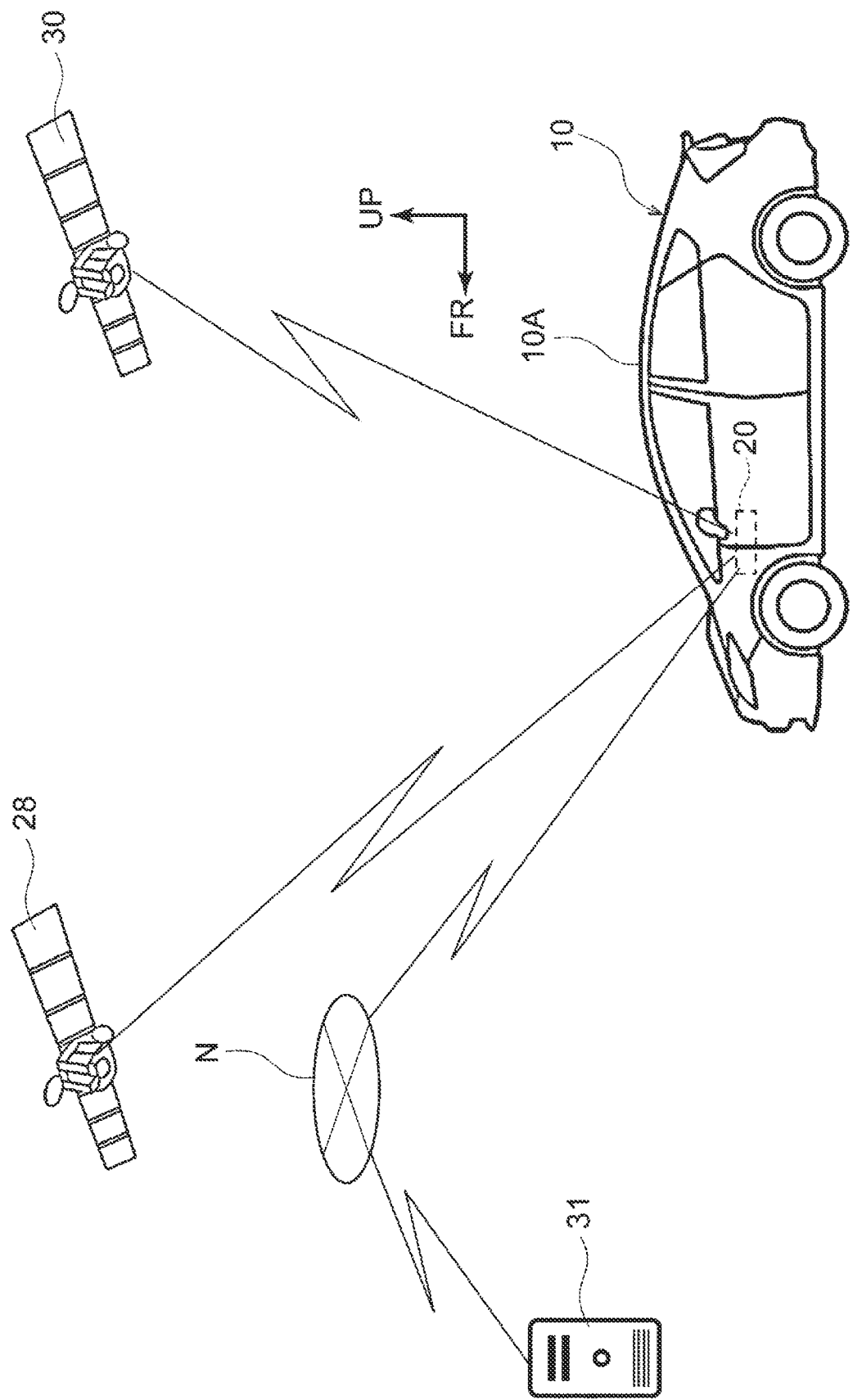
FIG. 1 is an image diagram schematically showing a relationship between a vehicle and its related equipment according to the present embodiment.

Hereinafter, an example of an embodiment of a vehicle according to the present disclosure will be described with reference to FIGS. 1 to 7. Note that the arrow FR appropriately shown in the drawings indicates the vehicle front side of the "vehicle 10" according to the present embodiment, the arrow UP indicates the vehicle upper side of the vehicle 10, and the arrow OUT indicates the vehicle widthwise outer side of the vehicle 10.

Figure 2:
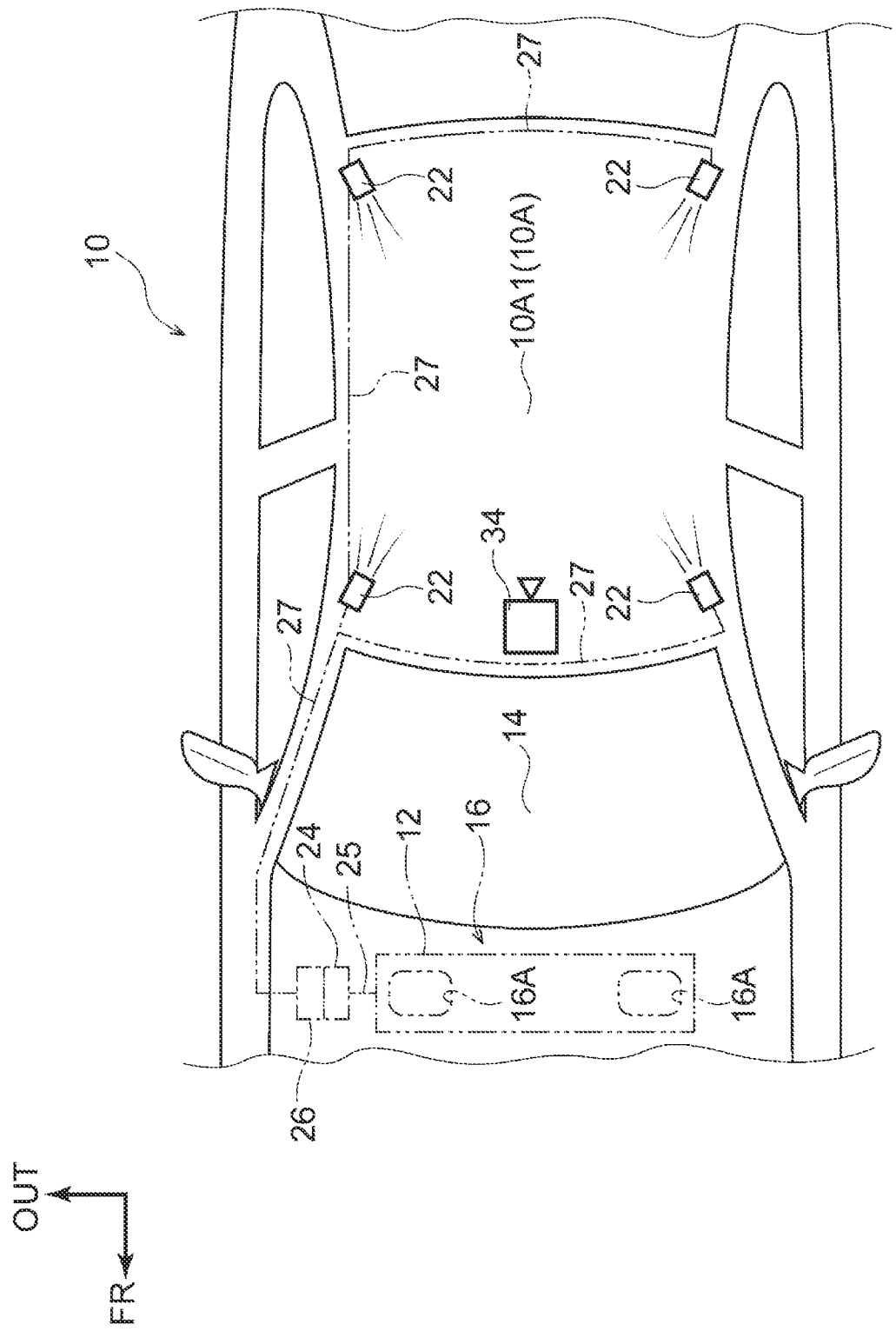
FIG. 2 is a plan view illustrating a configuration of a vehicle according to the present embodiment.
Figure 3:
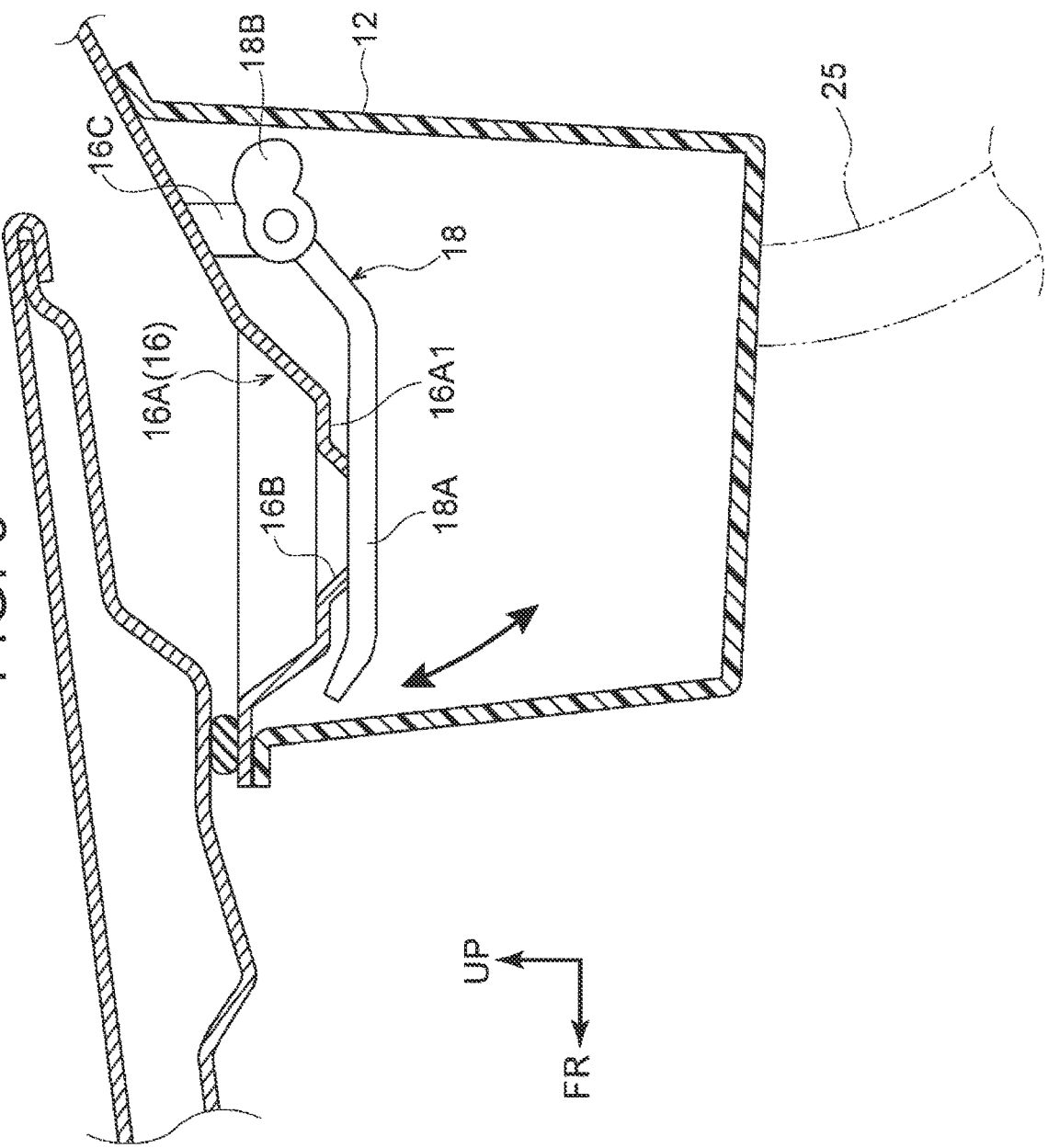
FIG. 3 is a cross-sectional view (a cross-sectional view taken along line 3-3 of FIG. 2) showing a configuration around a rainwater storage tank provided in the vehicle according to the present embodiment.

As shown in FIG. 2, the vehicle 10 is provided with a resin "rainwater storage tank 12" as a rainwater storage unit. As also shown in FIG. 3, the rainwater storage tank 12 is disposed on the vehicle lower side of the cowl louver 16 disposed along the lower end portion of the windshield glass 14.

Further, the rainwater storage tank 12 has a box shape in which the vehicle width direction is a longitudinal direction and the vehicle upper side is opened, and is attached to the cowl louver 16 via a mounting member (not shown). The vehicle upper side of the rainwater storage tank 12 is covered with a cowl louver 16. A seal member (not shown) is interposed between a portion of the rainwater storage tank 12 attached to the cowl louver 16 and the cowl louver 16.

On the other hand, the cowl louver 16 is provided with a pair of rain reservoir portion 16A at predetermined intervals in the vehicle widthwise direction with respect to each other at a part in front of the vehicle. These rain reservoir portions 16A are recessed portions recessed toward the vehicle lower side, and all of them are accommodated inside the rainwater storage tank 12 when viewed from the vehicle vertical direction.

Further, the lower wall portion 16A1 of the rain reservoir portion 16A, the discharge port portion 16B is provided, the discharge port portion 16B is adapted to be opened and closed by the balanced on-off valve 18. Specifically, the balanced on-off valve 18 includes a valve portion 18A capable of covering the discharge port portion 16B from the vehicle-lower side, and a weight portion 18B having a larger mass than the valve portion 18A. The balance-type on-off valve 18 is supported by a support portion 16C provided in the cowl louver 16 so as to be swingable about the vehicle-width-direction at a border portion between the valve portion 18A and the weight portion 18B.

In the balance-type on-off valve 18 configured as described above, when no load is applied to the valve portion 18A from the vehicle upper side, the valve portion 18A is pressed against the discharge port portion 16B from the vehicle lower side by the moment due to the gravitational force acting on the weight portion 18B. A seal member (not shown) is attached to the lower end portion of the discharge port portion 16B, and the seal member is in close contact with the valve portion 18A when the discharge port portion 16B is closed by the valve portion 18A. In addition, a mesh filter (not shown) is provided in the discharge port portion 16B.

On the other hand, when a predetermined amount of rainwater is accumulated in the rain reservoir portion 16A, the balance-type on-off valve 18 swings due to the weight of the rainwater, so that the discharge port portion 16B is opened and the rainwater accumulated in the rain reservoir portion 16A is stored in the rainwater storage tank 12.

Returning to FIG. 2, in the present embodiment, the "nozzle 22" as the ejection unit is provided at each of the four corners of the roof portion 10A of the vehicle 10. The nozzle 22 is disposed such that an ejection port (not shown) faces a central portion of the roof portion 10A when viewed from above and below the vehicle.

On the other hand, a pump 24 and an electromagnetic valve 26 are attached to the rainwater storage tank 12, and rainwater can be supplied from the rainwater storage tank 12 to the pump 24 via a hose 25, and the pump 24 and the electromagnetic valve 26 are connected by pipes (not shown).

Further, the electromagnetic valve 26 is connected to the four nozzles 22 via pipes 27 arranged inside a roof side rail and a roof reinforcement (not shown). The storm water stored in the rainwater storage tank 12 is pumped from the pump 24 to the nozzles 22 via the electromagnetic valve 26 and the pipe 27.

Here, in the present embodiment, by the control by the vehicle control device 20 (see FIG. 1) mounted on the vehicle 10, water is ejected from the nozzle 22 to a dirty area on the "surface 10A1" of the roof portion 10A. In addition, the vehicle 10 can be autonomously driven toward a point equal to or larger than a predetermined precipitation amount under the control of the vehicle control device 20.

Figure 4:
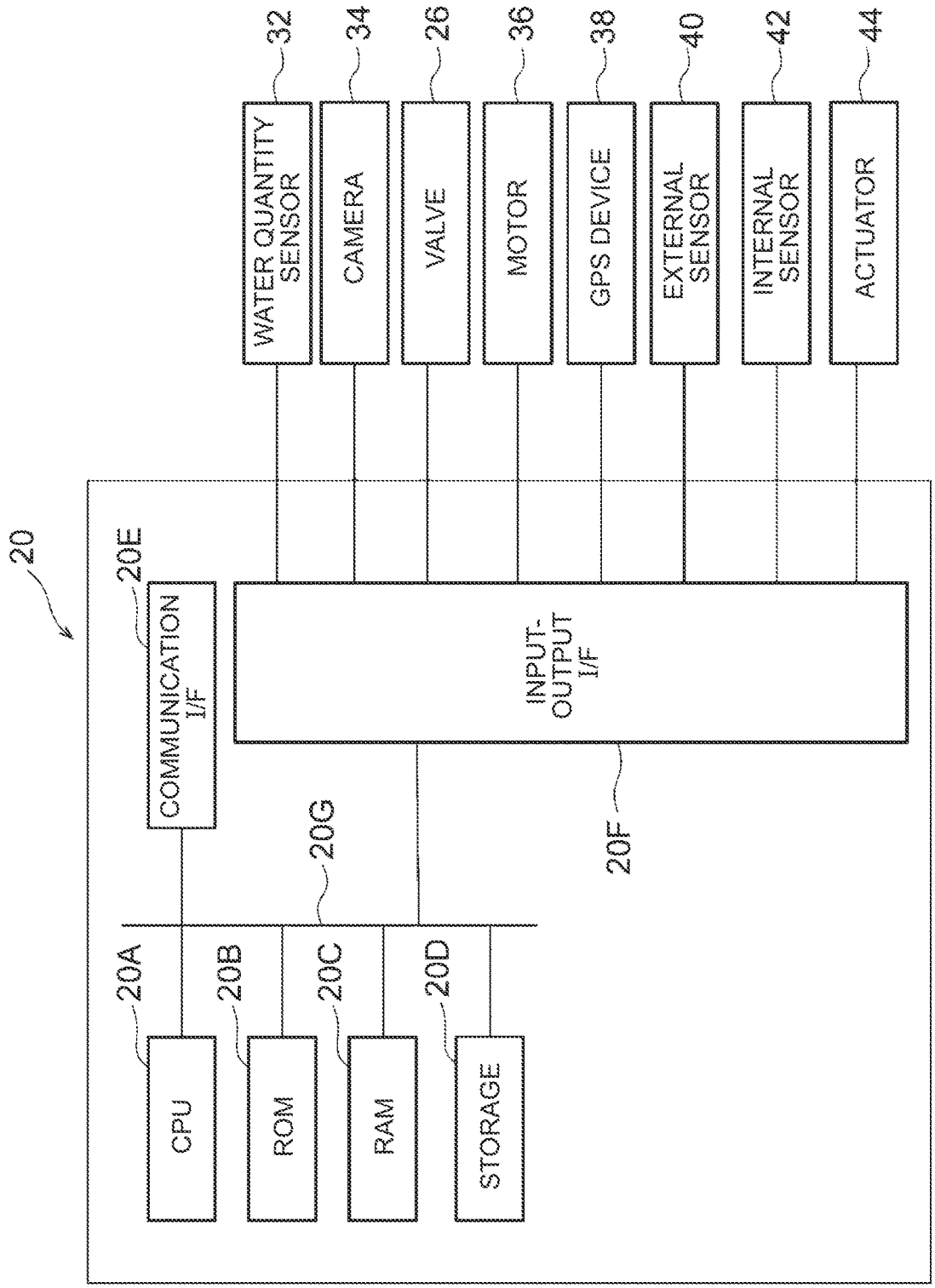
FIG. 4 is a block diagram illustrating a hardware configuration of a vehicle control device mounted on a vehicle according to the present embodiment and an association with a peripheral device thereof.

As illustrated in FIG. 4, the vehicle control device 20 includes a Central Processing Unit (CPU) 20A, Read Only Memory (ROM) 20B, Random Access Memory (RAM) 20C as a processor, a storage 20D, a communication Inter Face (I/F) 20E, and an input/output I/F 20F. CPU 20A, ROM 20B, RAM 20C, the storage 20D, the communication I/F 20E, and the input/output I/F 20F are communicably connected to each other via a bus 20G.

CPU 20A is a central processing unit and can execute various programs. Specifically, CPU 20A can read a program from ROM 20B and execute the program using RAM 20C as a working area. Then, the executable program stored in ROM 20B is read and executed by CPU 20A, so that the vehicle control device 20 can perform various functions as described later.

More specifically, ROM 20B stores various programs and various data. On the other hand, RAM 20C can temporarily store programs/data as a working area.

The storage 20D is configured to include Hard Disk Drive (HDD) or Solid State Drive (SSD), and stores various programs including an operating system, a dirt detection model to be described later, an ejection pattern of rainwater from the nozzle 22, and various data such as map information. As will be described later, the storage 20D can store information transmitted from the global precipitation satellites 28 and information acquired from various devices capable of communicating with the vehicle control device 20.

As also shown in FIG. 1, the communication I/F 20E is an interface used for connecting the vehicle-controlling device 20 to the network N, the "global precipitation satellite 28" as an artificial satellite, and Global Positioning System (GPS) satellite 30. For the interface, for example, communication standards such as Ethernet (registered trademark), fiber-distributed data interface (FDDI), and Wi-Fi (registered trademark) are used. The communication I/F 20E may include a radio device. The communication I/F 20E communicates with the data server 31 via the network N, so that various types of data can be transmitted and received to and from the data server 31. Specifically, the vehicle control device 20 acquires the map information from the data server 31 via the communication I/F 20E, and updates the map information stored in the storage 20D based on the map information.

In addition, the communication I/F 20E is capable of receiving, by communicating with the global precipitation satellite 28, precipitation distribution information or the like obtained by a two-frequency precipitation radar (not shown) or the like mounted on the global precipitation satellite 28. Various data acquired from the data servers 31, the global precipitation satellites 28, and GPS satellites 30 are stored in a storage 20D.

The input/output I/F 20F serves as an interface for the vehicle control device 20 to communicate with the respective devices mounted on the vehicle 10. The vehicle control device 20 is connected to various devices described later via an input/output I/F 20F so as to be able to communicate with each other. These devices may be directly connected to the bus 20G.

Examples of devices connected to the vehicle control device 20 include a water amount sensor 32, a camera 34, an electromagnetic valve 26, a motor 36, a GPS device 38, an external sensor 40, an internal sensor 42, and an actuator 44.

The water amount sensor 32 is disposed inside the rainwater storage tank 12, and transmits a water amount signal based on the displacement of the float floating on the water surface of the rainwater stored in the rainwater storage tank 12 to the vehicle control device 20. The amount of water in the rainwater storage tank 12 acquired by the amount-of-water sensor 32 is temporarily stored in the storage 20D.

As also shown in FIG. 2, the camera 34 is attached to the roof portion 10A, and is capable of capturing images of the entire surface 10A1 of the roof portion 10A. The image data of the image captured by the camera 34 is temporarily stored in the storage 20D.

A pump port (not shown) of the electromagnetic valve 26 is connected to the pump 24 via a pipe (not shown) as described above, so that the water pumped from the pump 24 flows in. Further, the electromagnetic valve 26 includes four outflow ports (not shown), and the nozzle 22 is connected to these outflow ports via the pipe 27 described above. The electromagnetic valve 26 can be controlled by the vehicle control device 20 to switch between a connection state in which the pump 24 and the nozzle 22 are connected and a non-connection state in which the pump 24 and the nozzle 22 are not connected in each of the nozzles 22. The electromagnetic valve 26 includes a relief valve (not shown). When the inside of the electromagnetic valve 26 becomes equal to or higher than a predetermined pressure, the relief valve is opened, and the water in the electromagnetic valve 26 flows into the rainwater storage tank 12 via a pipe (not shown).

The motor 36 is integrated with the pump 24 and is used for driving the pump 24, and its output can be adjusted by controlling a control unit (not shown) by the vehicle control device 20. That is, in the present embodiment, the output of the pump 24 is controlled by the vehicle control device 20.

GPS device 38 includes an antenna (not shown) that receives the position signal of the vehicle 10 from GPS satellites 30, and is capable of measuring the present position of the vehicle 10. The position data of the vehicles 10 measured by GPS device 38 is temporarily stored in the storage 20D.

The external sensor 40 is a sensor group used for detecting a state around the vehicle 10 during traveling of the vehicle 10. The external sensor 40 includes a camera that captures an image of a predetermined range around the vehicle 10, a millimeter wave radar that transmits a probe wave to the predetermined range, and a Laser Imaging Detection and Ranging (LiDAR) that scans the predetermined range. In addition, data acquired by the external sensor 40, such as images and videos by cameras, is stored in a storage 20D.

The internal sensor 42 is a sensor group used for detecting a traveling state of the vehicle 10, and includes a vehicle speed sensor, an acceleration sensor, a yaw rate sensor, and the like. The data acquired by the internal sensor 42 is temporarily stored in the storage 20D.

The actuator 44 includes a throttle actuator, a brake actuator, and a steering actuator (not shown). When the actuator 44 is controlled by the vehicle control device 20, a driving device (not shown) including an accelerator device, a brake device, and a steering device is controlled.

Figure 5:
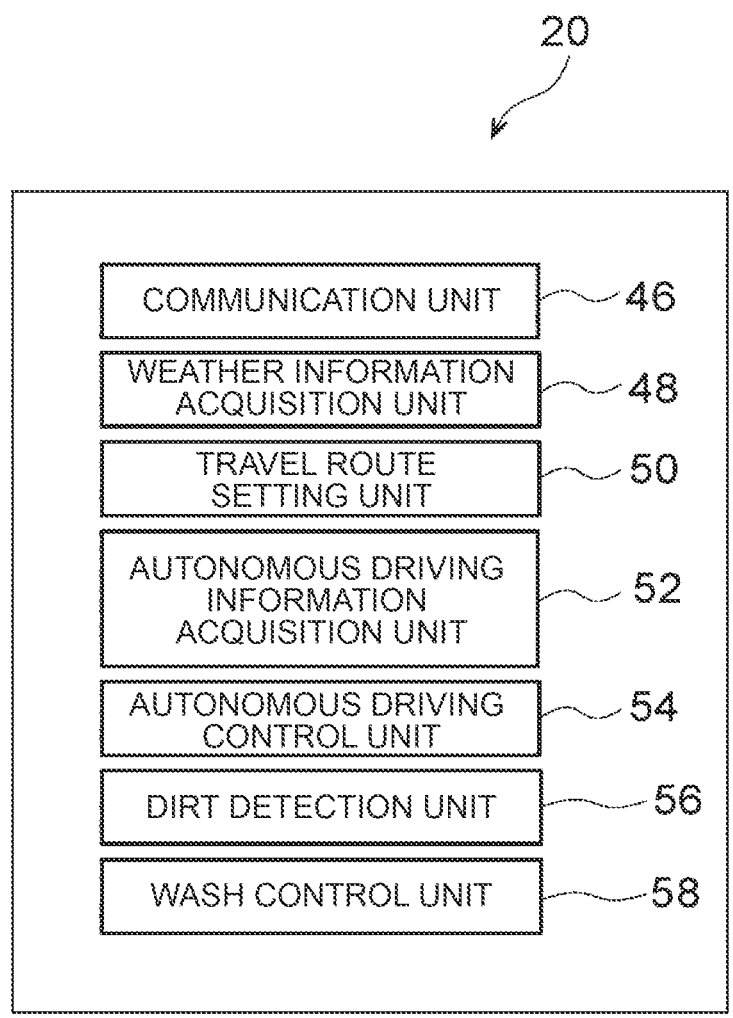
FIG. 5 is a block diagram illustrating a functional configuration of a vehicle control device mounted on a vehicle according to the present embodiment.

Next, a functional configuration of the vehicle control device 20 will be described with reference to FIG. 5. When detecting a predetermined operation input by an occupant of the vehicle 10 at an input unit (not shown), CPU 20A reads the execution program stored in ROM 20B and executes the read execution program, the vehicle control device 20 functions as an aggregate of the communication unit 46, the "weather information acquisition unit 48", the traveling route setting unit 50, the autonomous driving information acquisition unit 52, the "autonomous driving control unit 54", the "dirt detection unit 56", and the "wash control unit 58".

The communication unit 46 can transmit and receive various data to and from the data servers 31, the global precipitation satellites 28, and GPS satellites 30.

The weather information acquisition unit 48 can acquire the amount of precipitation in a predetermined area from the global precipitation satellite 28 as weather information. Specifically, the weather information acquisition unit 48 transmits the coordinate signal of the vehicle 10 based on the position of the vehicle 10 measured by GPS device 38 to the global precipitation satellites 28 via the communication unit 46. When receiving the coordinate signal from the vehicle 10, the global precipitation satellite 28 transmits position information (coordinates) of a point or an area equal to or larger than a predetermined precipitation amount within a predetermined range centered on the vehicle 10 to the communication unit 46, and the weather information acquisition unit 48 acquires the position information as weather information.

The traveling route setting unit 50 sets a traveling route of the vehicle 10 from the current location to a point or a region which is equal to or more than a predetermined precipitation amount and is closest to the vehicle 10 based on the position of the vehicle 10 measured by GPS device 38, the weather information acquired by the weather information acquisition unit 48, and the map information.

The autonomous driving information acquisition unit 52 is capable of acquiring data necessary for autonomous driving of the vehicle 10. The information acquired by the autonomous driving information acquisition unit 52 includes position information of the vehicle 10 measured by GPS device 38, data related to the surrounding environment of the vehicle 10 obtained by the external sensor 40, data related to the traveling state of the vehicle 10 obtained by the internal sensor 42, traveling route information set by the traveling route setting unit 50, and the like. The autonomous driving information acquisition unit 52 transmits the data to the autonomous driving control unit 54.

The autonomous driving control unit 54 controls the actuator 44 based on the information acquired by the autonomous driving information acquisition unit 52 to cause the vehicle 10 to autonomously drive from the current location to a point or area that is equal to or more than a predetermined precipitation amount and is closest to the vehicle 10.

The dirt detection unit 56 inputs an image of the surface 10A1 of the roof portion 10A captured by the camera 34 to the dirt detection model, thereby outputting the presence or absence of dirt on the surface 10A1 and the position information of the dirty area on the surface 10A1. When a dirty area is detected on the surface 10A1, the dirt detection unit 56 transmits a dirt detection signal and a dirt position signal indicating the position of the dirty area to the wash control unit 58.

Note that the dirt detecting model is, for example, a machine-learned model learned according to a machine-learning technique such as a convolutional neural network by using a set of image data of a surface 10A1 having a dirty area and data of position information of the dirty area on the surface 10A1 as teacher data.

When the dirt signal is detected from the dirt detection unit 56, the wash control unit 58 acquires the position of the dirty area on the surface 10A1 based on the dirt position signal received from the dirt detection unit 56. Then, the wash control unit 58 controls the motor 36 and the electromagnetic valve 26 based on the ejection pattern of the rainwater by the plurality of nozzles 22 determined in advance according to the position of the dirty area, so as to eject the rainwater to the dirty area for a predetermined time from the nozzle 22 located at a position where the nozzle 22 can eject water to the dirty area. The wash control unit 58 restricts the driving of the motor 36 and the electromagnetic valve 26 when it is determined that the amount of rainwater stored in the rainwater storage tank 12 is equal to or less than a predetermined amount based on the water amount signal from the water amount sensor 32.

Operation and Effect of the Present Embodiment

Next, operations and effects of the present embodiment will be described.

Figure 6:
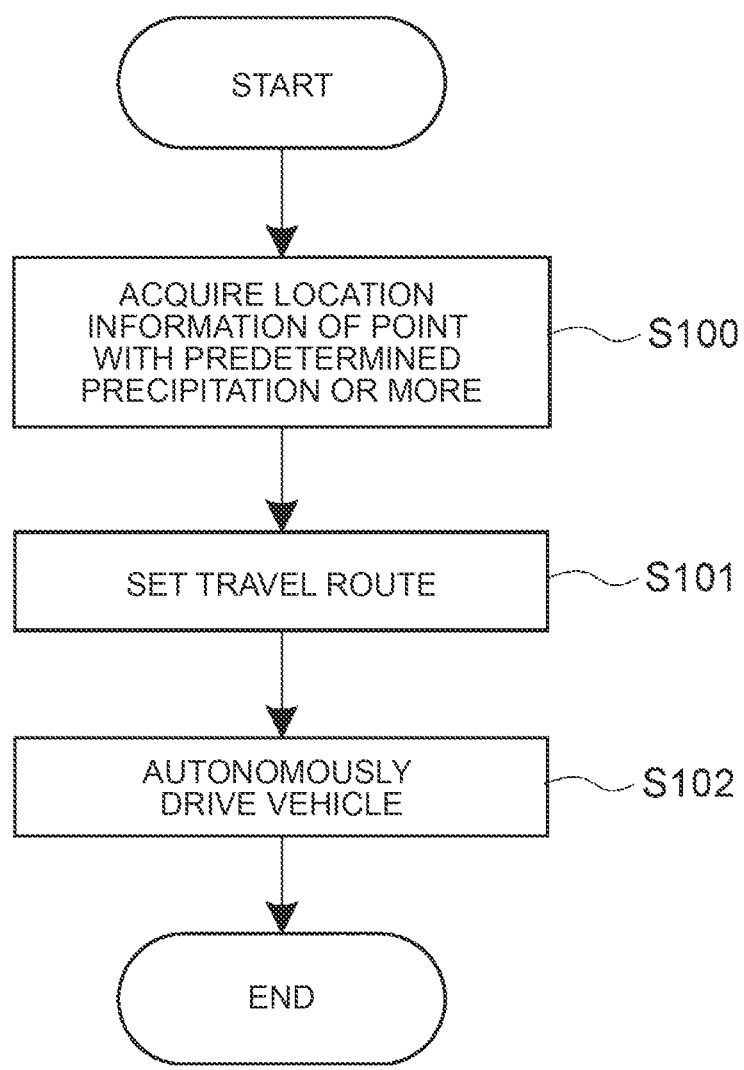
FIG. 6 is a flow chart showing a flow of a process at the time of autonomous driving of a vehicle by the vehicle control device mounted on the vehicle according to the present embodiment.

Hereinafter, an example of a control flow during autonomous driving of the vehicle 10 by the vehicle control device 20 will be described mainly with reference to a flowchart illustrated in FIG. 6. The control flow starts when the vehicle control device 20 detects the first operation input to the input unit of the occupant of the vehicle 10.

When this control flow is started, in S100, CPU 20A of the vehicle control device 20 acquires position information of a point equal to or larger than a predetermined precipitation amount within a predetermined area centered on the vehicle 10 from the global precipitation satellites 28.

In S101, CPU 20A sets a traveling route of the vehicle 10 using a point that is equal to or more than a predetermined precipitation amount and is closest to the vehicle 10 from the current location as a destination, based on the position information of the position of the vehicle 10, the position information of the point that is equal to or more than the predetermined precipitation amount, and the map information.

In S102, CPU 20A controls the actuator 44 to autonomously drive the vehicle 10 to the destination and terminate the control process.

Therefore, in the present embodiment, it is possible to increase the likelihood that the vehicle 10 is located at a point where it is raining, and it is possible to store rainwater in the rainwater storage tank 12. In addition, the vehicle 10 can be cleaned by rain falling on the vehicle 10. As described above, in the present embodiment, it is possible to increase the likelihood that rainwater is supplied to the vehicle 10.

Next, an example of a control flow at the time of cleaning the vehicle 10 by the vehicle control device 20 will be described by mainly using the flowchart shown in FIG. 7. The control flow starts when the vehicle control device 20 detects a second operation input to the input unit of the occupant of the vehicle 10.

In S200, CPU 20A determines the presence or absence of stains on the surface 10A1 by inputting images of the surface 10A1 of the roof portion 10A captured by the camera 34 to the stain detecting model. Then, when CPU 20A determines that there is a dirty area on the surface 10A1 (S200: YES), the process proceeds to S201. On the other hand, when it is determined that there is no dirty area on the surface 10A1 (S200: NO), CPU 20A ends the control process.

In S201, CPU 20A obtains the position information of the dirty area on the surface 10A1 from the output of the detection model, and proceeds to S202.

In S202, CPU 20A controls the motor 36 and the electromagnetic valve 26 based on the position of the dirty area to eject rainwater from the nozzle 22 to the dirty area for a predetermined period, and returns to S200.

Therefore, in the present embodiment, the rainwater stored in the rainwater storage tank 12 is jetted onto the surface 10A1 of the vehicle 10 by the nozzle 22, and dirt or the like adhering to the surface 10A1 can be washed away. Therefore, in the present embodiment, rainwater can be used to clean the vehicle 10.

Further, in the present embodiment, the dirt detection unit 56 detects a dirty area on the surface 10A1 based on images of the surface 10A1 of the vehicles 10. Then, the wash control unit 58 causes the nozzle 22 to eject rainwater to the dirty area. Therefore, in the present embodiment, it is possible to eject rainwater intensively to a dirty area on the surface 10A1. Therefore, in the present embodiment, it is possible to reduce the amount of rainwater required to clean the vehicle 10.

In the above embodiment, the rainwater stored in the rainwater storage tank 12 is used to clean the vehicle 10, but the rainwater may be used for drinking by installing a filter in the rainwater storage tank 12.

The position where the rainwater storage tank 12 is disposed is not limited to the position described above. For example, in a case where the rainwater storage tank 12 is installed in a vehicle having a high vehicle height such as a bus, the rainwater storage tank 12, the rainfall reservoir, and the balance-type on-off valve 18 may be disposed in the roof portion of the vehicle.

Further, the number and orientation of the nozzles 22 can be changed as appropriate in accordance with the specifications of the roof portion 10A and the like. The nozzle 22 may be provided in a pillar portion of the vehicle 10 or the like in addition to the roof portion 10A.

What is claimed is:

1. A vehicle, comprising:
   a rainwater storage unit being made of a resin and having a box shape for storing rainwater;
   an ejection unit configured to eject, onto a surface of the vehicle, the rainwater stored in the rainwater storage unit; and
   a processor configured to
      acquire weather information from an artificial satellite, the weather information including position information on locations receiving at least a predetermined precipitation amount within a predetermined distance from the vehicle, and
      cause the vehicle to travel to the location closest to the vehicle among the locations.

2. The vehicle according to claim 1, wherein the processor is configured to:
   detect a dirty area on the surface based on an image of the surface; and
   cause the ejection unit to eject the rainwater to the dirty area.

3. The vehicle according to claim 1, wherein the processor is configured to cause the ejection unit to prohibit ejecting the rainwater in a case where the processor determines that the rainwater stored in the rainwater storage unit is equal to or less than a predetermined storing amount.

4. A vehicle, comprising:
- a rainwater storage unit being made of a resin and having a box shape for storing rainwater;
- an ejection unit configured to eject, onto a surface of the vehicle, the rainwater stored in the rainwater storage unit; and
- a processor configured to
    - acquire weather information from an artificial satellite, the weather information including position information on locations receiving at least a predetermined precipitation amount within a predetermined distance from the vehicle, and
    - cause the vehicle to travel to the location with the highest precipitation amount among the locations.

* * * * *